(12) United States Patent
Margiott

(10) Patent No.: US 9,742,196 B1
(45) Date of Patent: Aug. 22, 2017

(54) FUEL CELL POWER PLANT COOLING NETWORK INTEGRATED WITH A THERMAL HYDRAULIC ENGINE

(71) Applicant: DOOSAN FUEL CELL AMERICA, INC., South Windsor, CT (US)

(72) Inventor: Paul Margiott, South Windsor, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 0 days.

(21) Appl. No.: 15/052,089

(22) Filed: Feb. 24, 2016

(51) Int. Cl.
| F02B 63/04 | (2006.01) |
| F03G 7/08 | (2006.01) |
| H02K 7/18 | (2006.01) |
| F01D 15/10 | (2006.01) |
| F02C 6/00 | (2006.01) |
| H02P 9/04 | (2006.01) |
| H02J 3/46 | (2006.01) |
| H01M 8/04029 | (2016.01) |
| H01M 8/04992 | (2016.01) |
| H01M 8/04007 | (2016.01) |
| H01M 8/04746 | (2016.01) |
| F01B 29/08 | (2006.01) |
| F01K 25/00 | (2006.01) |
| F02G 1/04 | (2006.01) |

(52) U.S. Cl.
CPC ........... *H02J 3/46* (2013.01); *H01M 8/04029* (2013.01); *H01M 8/04074* (2013.01); *H01M 8/04768* (2013.01); *H01M 8/04992* (2013.01); *H01M 2250/402* (2013.01)

(58) Field of Classification Search
USPC ...... 290/1 R, 52, 54; 60/516, 525, 645, 651, 60/660
See application file for complete search history.

(56) References Cited

U.S. PATENT DOCUMENTS

| 3,975,913 | A | * | 8/1976 | Erickson | ............... F01K 25/005 122/21 |
| 5,000,003 | A | * | 3/1991 | Wicks | ................... F01K 23/065 60/618 |

(Continued)

OTHER PUBLICATIONS

International Search Report and Written Opinion of the International Searching Authority for International application No. PCT/US2017/018616 dated May 23, 2017.

*Primary Examiner* — Pedro J Cuevas
(74) *Attorney, Agent, or Firm* — Carlson, Gaskey & Olds

(57) ABSTRACT

An illustrative example electrical power generating system includes a fuel cell power plant that is configured to generate electrical power. The fuel cell power plant includes a cell stack assembly including a plurality of fuel cells that are configured to generate electrical power based on a chemical reaction. A coolant network is configured to carry fluid toward the cell stack assembly where fluid in the coolant network can become heated by absorbing heat from the fuel cell power plant. The coolant network includes a thermal hydraulic engine that is configured to generate electrical power. The coolant network is configured to carry the heated fluid to the thermal hydraulic engine where the heated fluid can be used for generating electrical power. The coolant network is configured to carry a reduced temperature fluid from the thermal hydraulic engine back toward the cell stack assembly.

15 Claims, 3 Drawing Sheets

(56) References Cited

U.S. PATENT DOCUMENTS

| | | | | |
|---|---|---|---|---|
| 5,440,882 | A * | 8/1995 | Kalina | F01K 23/04 60/641.2 |
| 5,899,067 | A | 5/1999 | Hageman | |
| 5,916,140 | A | 6/1999 | Hageman | |
| 6,446,597 | B1 * | 9/2002 | McAlister | F02B 3/06 123/296 |
| 8,099,198 | B2 * | 1/2012 | Gurin | B60K 6/28 180/65.21 |
| 8,528,333 | B2 * | 9/2013 | Juchymenko | F01K 23/065 60/618 |
| 8,613,195 | B2 * | 12/2013 | Held | F01K 3/185 60/645 |
| 8,616,001 | B2 * | 12/2013 | Held | F01K 13/02 60/645 |
| 8,794,002 | B2 * | 8/2014 | Held | F01K 3/185 60/651 |
| 8,813,497 | B2 * | 8/2014 | Hart | F01K 3/185 60/641.1 |
| 8,966,901 | B2 * | 3/2015 | Held | F01K 3/185 60/645 |
| 8,991,340 | B2 * | 3/2015 | Wood | F02B 63/04 123/149 R |
| 9,115,605 | B2 * | 8/2015 | Held | F01K 3/185 |
| 9,341,084 | B2 * | 5/2016 | Xie | F01K 25/103 |
| 9,441,504 | B2 * | 9/2016 | Held | F01K 23/10 |
| 9,458,738 | B2 * | 10/2016 | Held | F01K 3/185 |
| 2005/0167169 | A1 * | 8/2005 | Gering | B60H 1/00278 237/12.3 B |
| 2005/0262842 | A1 | 12/2005 | Claassen et al. | |
| 2006/0055175 | A1 * | 3/2006 | Grinblat | F03B 13/26 290/54 |
| 2006/0066113 | A1 * | 3/2006 | Ebrahim | H02P 9/04 290/52 |
| 2006/0225441 | A1 | 10/2006 | Goenka et al. | |
| 2008/0211230 | A1 * | 9/2008 | Gurin | B60L 11/1861 290/2 |
| 2009/0320477 | A1 * | 12/2009 | Juchymenko | F01K 23/065 60/651 |
| 2010/0227239 | A1 | 9/2010 | Nitta et al. | |
| 2012/0240882 | A1 | 9/2012 | Gao et al. | |
| 2013/0056993 | A1 | 3/2013 | Newcomb | |
| 2014/0005844 | A1 | 1/2014 | Newcomb | |
| 2014/0033713 | A1 * | 2/2014 | Juchymenko | F01K 23/065 60/655 |
| 2014/0329160 | A1 | 11/2014 | Ramaswamy et al. | |
| 2014/0353975 | A1 | 12/2014 | Newcomb | |
| 2015/0184532 | A1 * | 7/2015 | McAlister | F03G 6/00 290/52 |

* cited by examiner

FUEL CELL POWER PLANT COOLING NETWORK INTEGRATED WITH A THERMAL HYDRAULIC ENGINE

This disclosure pertains to fuel cell power plants and, more particularly but without limitation, to a fuel cell power plant integrated with a thermal hydraulic engine.

BACKGROUND

There are various known systems for generating electrical power. One type of system is known as a fuel cell power plant. A cell stack assembly including a plurality of individual fuel cells generates electrical power based on an electrochemical reaction that the fuel cells facilitate when provided with reactants, such as hydrogen and oxygen. A variety of fuel cell power plant configurations are known and in use.

Typical cell stack assemblies require cooling to control or maintain a desired operating temperature. Some components of the fuel cells may degrade if appropriate temperatures are not maintained. Additionally, the power generating efficiency of a cell stack assembly often depends upon appropriate temperature management.

Cell stack assemblies often have associated coolers for preventing the temperature within the cell stack assemblies from becoming too high. Fuel cell power plants often include an ancillary coolant loop that includes one or more heat rejection heat exchangers that perform a thermal management function within the fuel cell power plant. The heat rejection heat exchangers are upstream of a low grade heat exchanger from which coolant typically circulates back toward the heat rejection heat exchangers.

Thermal hydraulic engines can also produce electrical power. Thermal hydraulic engines typically utilize heat to cause fluid expansion. A mechanical component, such as a piston, moves as a result of the fluid expansion. The thermal hydraulic engine may be configured to operate as an electrical generator such that the motion of the mechanical component is converted into electrical power.

SUMMARY

An illustrative example electrical power generating system includes a fuel cell power plant including a cell stack assembly having a plurality of fuel cells that are configured to generate electrical power based on a chemical reaction. A coolant network is configured to carry fluid toward the cell stack assembly where fluid in the coolant network can become heated fluid by absorbing heat from the fuel cell power plant. The coolant network includes a thermal hydraulic engine that is configured to generate electrical power, a cooling station configured to reduce a temperature of fluid provided to the cooling station, a first portion configured to carry fluid from the cooling station toward a portion of the fuel cell power plant where fluid in the first portion can be heated, and a second portion configured to carry coolant fluid that has been heated away from the fuel cell power plant, the second portion including a heated fluid inlet of the thermal hydraulic engine. The thermal hydraulic engine is configured to direct heated fluid from the inlet to a section of the thermal hydraulic engine where heat from the heated fluid can be used for generating electrical power. The thermal hydraulic engine includes a fluid outlet that is configured to direct fluid from which heat has been used for generating electrical power away from the thermal hydraulic engine in a direction toward the cooling station. The cooling station is configured to reduce a temperature of fluid received from the thermal hydraulic engine before the fluid is provided to the first portion.

Another illustrative example embodiment is an electrical power generating system including a fuel cell power plant having a cell stack assembly with a plurality of fuel cells that are configured to generate electrical power based on a chemical reaction. A single cooling station is configured to reduce a temperature of a cooling fluid. A coolant network includes a first cooling loop including at least one heat rejection heat exchanger downstream of the cooling station and a low grade heat exchanger downstream of the at least one heat rejection heat exchanger. The cooling station is downstream of the low grade heat exchanger. The low grade heat exchanger has a first portion configured to receive heated fluid from the heat rejection heat exchanger and to direct the received fluid toward the cooling station. The coolant network includes a second cooling loop that directs a second fluid through the low grade heat exchanger where the second fluid is heated by heat from the heated fluid in the first portion of the low grade heat exchanger. The second cooling loop includes a portion configured to direct heated second fluid to a section of the hydraulic engine where heat from the heated second fluid can be used for generating electrical power before the second fluid is returned toward the low grade heat exchanger. The coolant network includes a third cooling loop configured to direct fluid from the cooling station toward the thermal hydraulic engine where the fluid can absorb heat from at least some of the hydraulic engine before returning the fluid to the cooling station.

Various features and advantages of disclosed example embodiments will become apparent to those skilled in the art from the following detailed description. The drawings that accompany the detailed description can be briefly described as follows.

DETAILED DESCRIPTION

Figure 1:
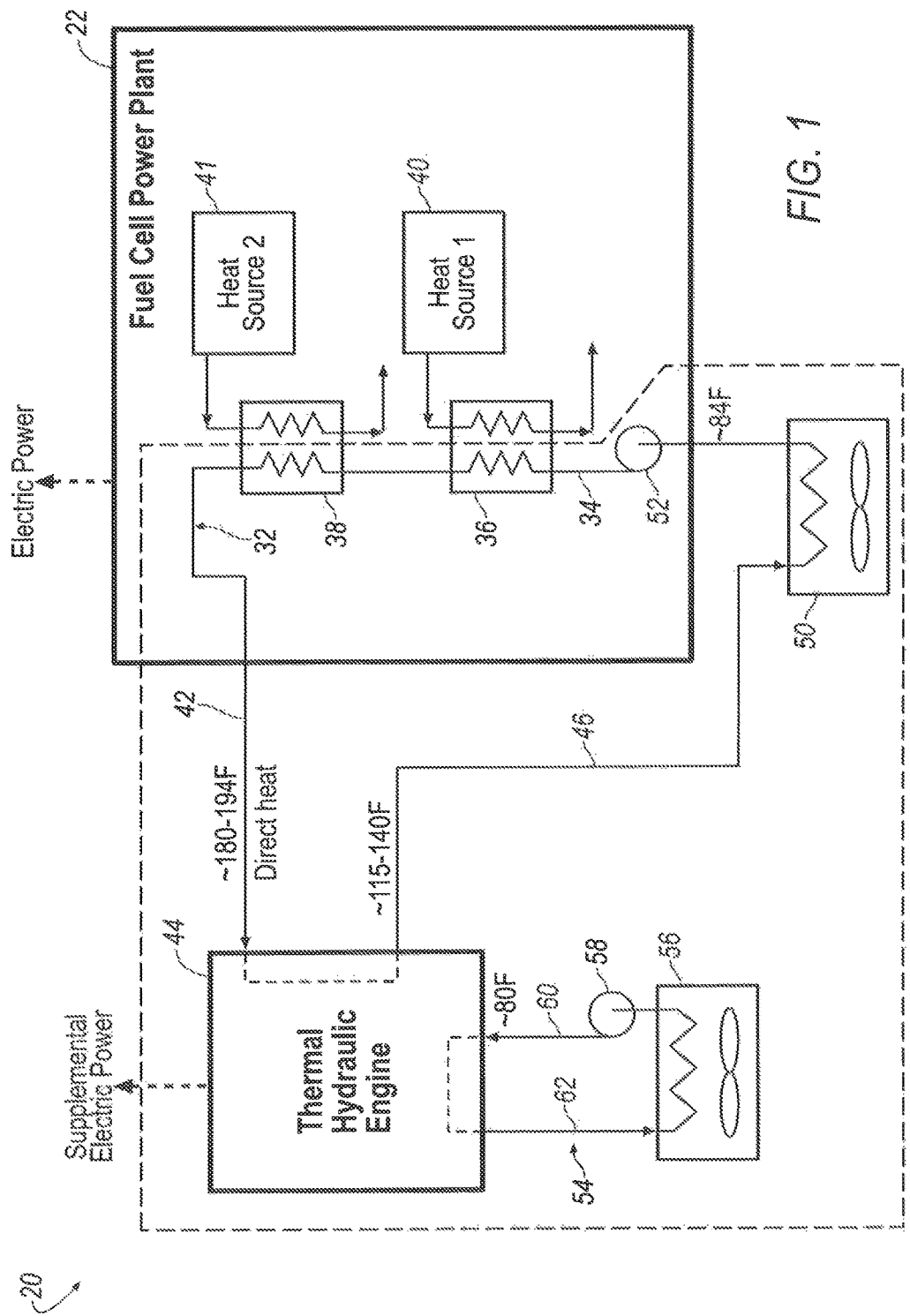
FIG. 1 schematically illustrates an electrical power generating system designed according to an embodiment of this invention.

FIG. 1 schematically illustrates an electrical power generating system 20. A fuel cell power plant 22 includes a cell stack assembly (CSA), which includes a plurality of fuel cells that generate electrical power based on a chemical reaction in a known manner. In the illustrated example, the fuel cell power plant 22 serves as a primary source of electrical power provided by the system 20.

A coolant network 30 provides a cooling function for the fuel cell power plant 22 to maintain operating temperatures of the fuel cells in the CSA within a desired range, for example. The coolant network 30 in this example includes a coolant loop 32. A first portion 34 of the coolant loop 32 directs a coolant fluid, such as water, glycol or a mixture of those two, toward the fuel cell power plant 22. In this example, the first portion 32 includes a water recovery condenser heat exchanger 36 and at least one heat rejection heat exchanger 38. The heat exchangers 36 and 38 provide a thermal management function within the fuel cell power plant.

In the illustrated example, the CSA has associated coolers that are utilized for keeping the temperatures within the CSA within a desired range in a known manner. The heat exchangers 36 and 38 are situated so that fluid flowing through the first portion 34 of the coolant loop 32 can absorb heat from heat sources schematically shown at 40 and 41. In the illustrated example, the heat source 40 comprises exhaust heat resulting from operation of the CSA in the fuel cell power plant 22 and the heat source 42 comprises one or more coolers used for controlling a temperature of the CSA.

A second portion 42 of the coolant loop 32 carries heated fluid away from the heat rejection heat exchanger 38. The coolant network 30 includes a thermal hydraulic engine 44. The second portion 42 of the coolant loop 32 carries heated fluid to a heated fluid inlet of the thermal hydraulic engine 44. The heated fluid is provided to a section of the thermal hydraulic engine 44 where heat from the heated fluid can be used for generating electrical power. The thermal hydraulic engine 44 is designed to work based on known techniques for utilizing heat to generate electrical power. In this example, the thermal hydraulic engine 44, which is a portion of the coolant network 30, operates as a secondary source of electrical power provided by the system 20. The electrical power output of the thermal hydraulic engine 44 in this example is considered secondary because the output from the thermal hydraulic engine 44 is less than the electric power output from the fuel cell power plant 22.

The thermal hydraulic engine 44 in this example also operates as a low grade heat exchanger of the coolant loop 32. The heated fluid provided to the thermal hydraulic engine is at least partially cooled as the heat is utilized for power generation and a reduced temperature fluid is carried away from the engine 44 by a third portion 46 of the coolant loop 32.

The coolant loop 32 includes a cooling member or cooling station 50 that further reduces the temperature of fluid provided to it before that fluid is returned to the first portion 34 and the fuel cell power plant 22. A pump 52 circulates fluid through the coolant loop 32.

In one example, fluid from the cooling station 50 has a temperature on the order of 84° F., a temperature of the heated fluid in the second portion 42 has a temperature on the order of 180° to 194° F., and a temperature of the reduced temperature fluid in the third portion 46 is on the order of 115° to 140° F. In some embodiments, the thermal hydraulic engine 44 has an ideal temperature for heated fluid in the second portion 42 of 180° F. Operation of the pump 52, cooling station 50 or the fuel cell power plant 22 may be controlled to achieve a temperature of fluid within the second portion 42 as close as possible to the 180° F. set point temperature for the hydraulic engine 44. The fluid flow rate within the coolant loop 32 may be controlled to provide a desired amount of temperature management within the fuel cell power plant 22, a desired amount of heated fluid to the thermal hydraulic engine 44, or both. Additional bypass lines may be included at different locations along the coolant loop 32 for further management of fluid flow and temperatures within the coolant network 30.

The illustrated example includes an engine cooling loop 54 that carries a cooling fluid to the thermal hydraulic engine 44 for controlling a temperature of at least a portion of the thermal hydraulic engine 44. In this example, the engine cooling loop 54 includes a cooling station 56 that is distinct and separate from the cooling station 50. A pump 58 directs fluid from the cooling station 56 into a first portion 60 of the engine cooling loop 54. Fluid in the first portion 60 is directed to the thermal hydraulic engine 44 where it can absorb heat from the thermal hydraulic engine 44. Heated fluid is then returned to the cooling station 56 in a second portion 62 where the fluid is cooled and then returned to the thermal hydraulic engine 44 as necessary.

The cooling stations 50 and 56 may be similarly configured or may be different. For example, one or both of the cooling stations 50, 56 may be a wet cooling tower or a dry cooling tower. Those skilled in the art who have the benefit of this description will be able to select appropriate cooling elements or cooling station components to meet their particular needs.

Figure 2:
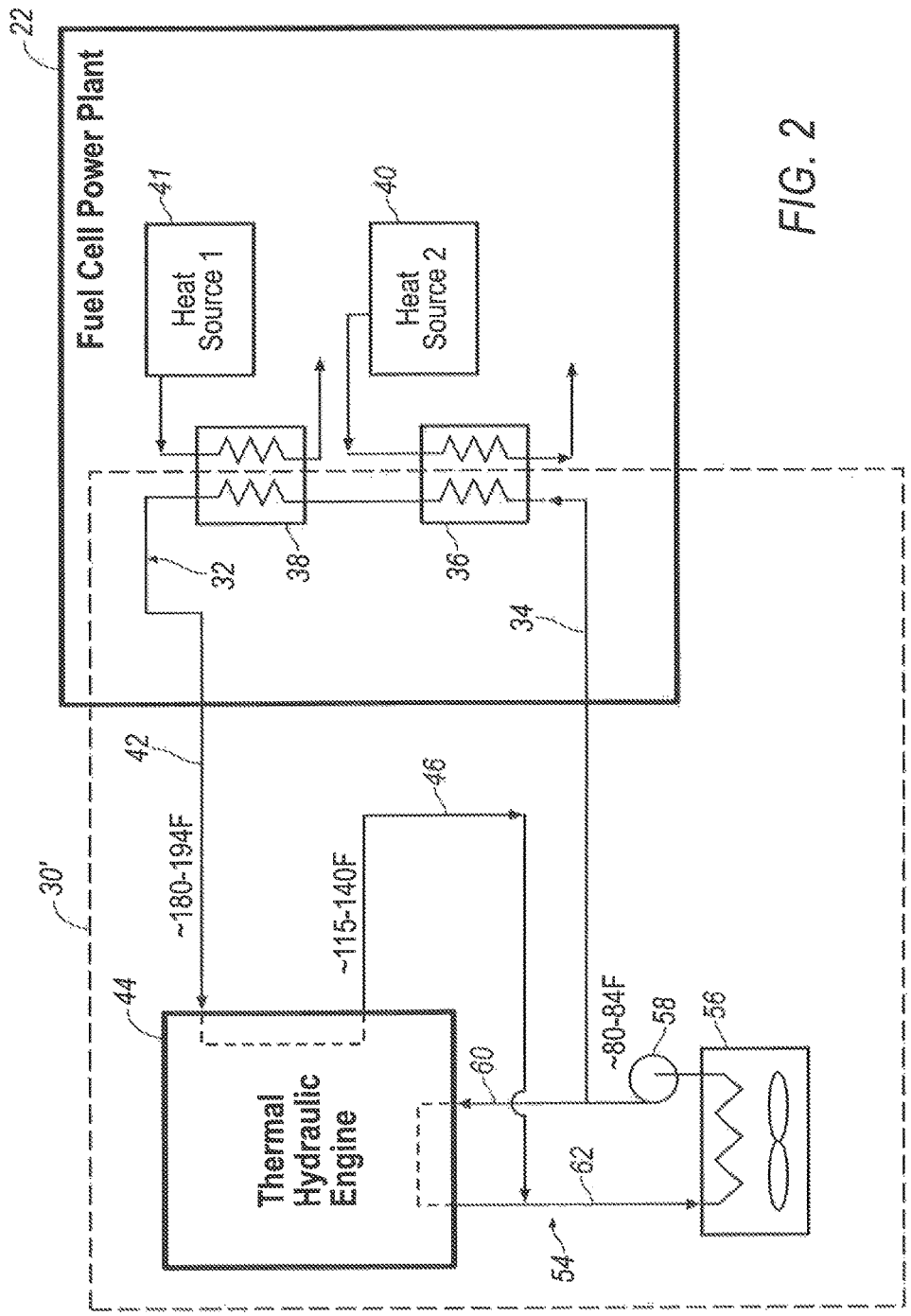
FIG. 2 schematically illustrates another example embodiment of an electrical power generating system.

FIG. 2 illustrates another example embodiment of an electrical power generating system 20. In this example, the coolant network 30' has a single cooling station 56 that facilitates reducing a temperature of fluid in the coolant loop 32 and the engine cooling loop 54. In this example, the third portion 46 of the coolant loop 32 directs fluid toward the cooling station 56 instead of the cooling station 50 as was the case in the example of FIG. 1. In this particular example, the third portion 46 directs fluid into the second portion 62 of the engine cooling loop 54 where that fluid then flows into the cooling station 56. The example of FIG. 2 reduces the number of cooling stations required and integrates the external cooling function into a single station 56.

Control valves (not illustrated) and an appropriate control algorithm may be used for managing how much of the fluid within the coolant network is directed into the coolant loop 32 and the engine cooling loop 54, respectively. In the example of FIG. 1, the fluid within the engine cooling loop 54 was separate and distinct from the fluid within the coolant loop 32. In the example of FIG. 2, the fluid within the engine cooling loop 54 and the coolant loop 32 is at least partially mixed.

Figure 3:
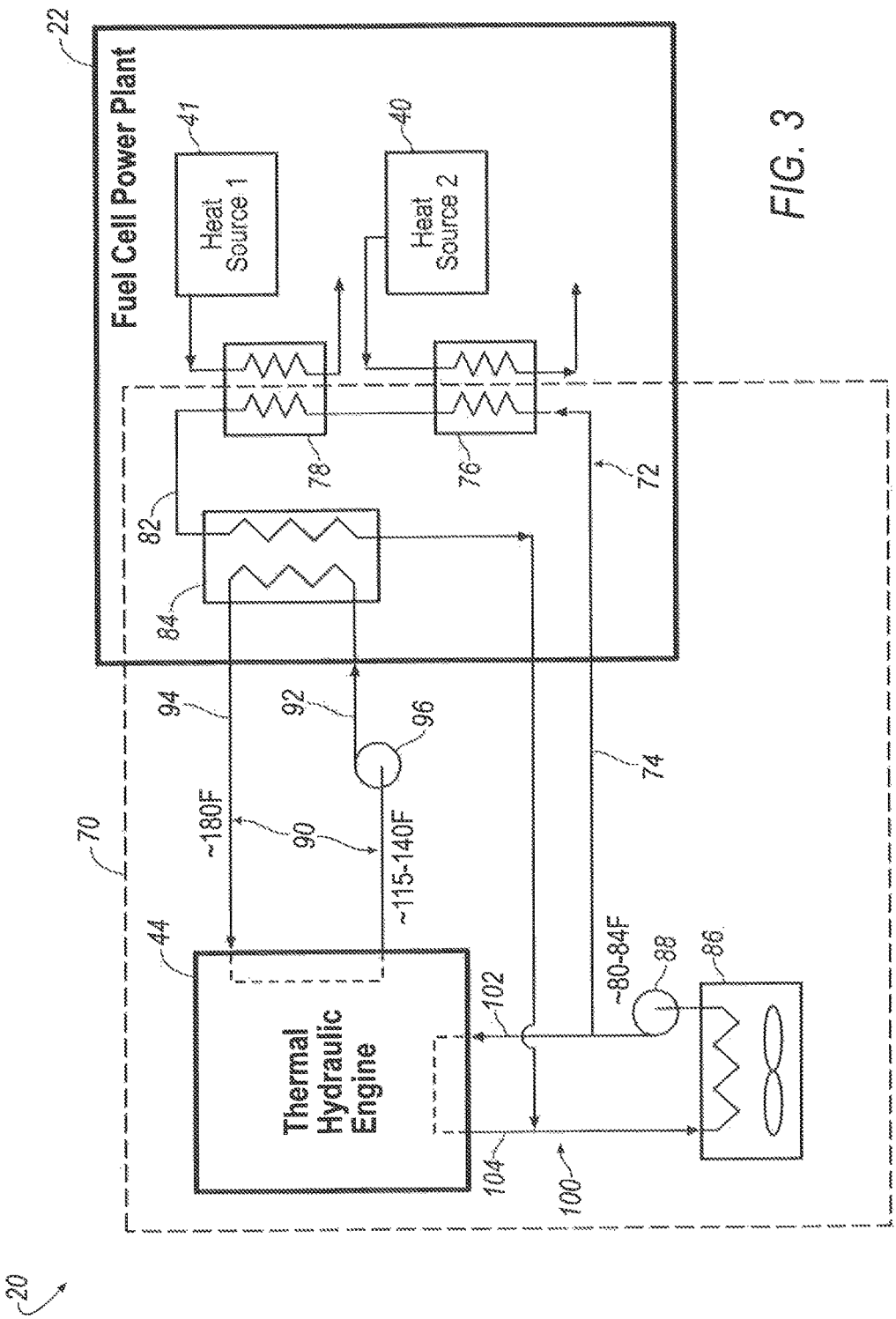
FIG. 3 illustrates another embodiment.

FIG. 3 illustrates another example embodiment. The coolant network 70 in this example includes a first coolant loop 72 having a first portion 74 that directs cooling fluid toward the fuel cell power plant 22. Heat rejection heat exchangers 76 and 78 are associated with the heat sources 40 and 41, respectively, so that fluid within the first portion 74 can absorb heat resulting from operation of the CSA, for example. Heated fluid is directed away from the heat rejection heat exchanger 78 by a second portion 82 of the coolant loop 72. The second portion 82 passes through a low grade heat exchanger 84 of the fuel cell power plant 22. A second cooling loop 90 includes a first portion 92 that at least partially passes through the low grade heat exchanger 84 so that fluid within the first portion 92 is heated by absorbing heat from the heated fluid within the second portion 82 of the first cooling loop 72. The heated fluid within the first portion 92 is carried away from the low grade heat exchanger 84 by a second portion 94 of the second cooling loop 90. The second portion 94 directs the heated fluid to the thermal hydraulic engine 44 where heat from the heated fluid can be used for generating electrical power. The second cooling loop 90 includes a pump 96 for circulating cooling fluid within the second loop 90.

The fluid in the first cooling loop 72 is directed from the low grade heat exchanger 84 along at least one conduit 98 toward an engine cooling loop 100. That fluid is cooled by a cooling station 86 where the temperature of the fluid may be reduced to a desired level. A pump 88 controls flow of fluid within the first cooling loop 72. The pump 88 also controls fluid flow within the engine cooling loop 100 to provide coolant fluid along a first portion 102 where it is directed to the thermal hydraulic engine 44. After that fluid has absorbed heat for purposes of cooling at least a portion of the thermal hydraulic engine 44 that fluid is returned in a second portion 104 toward the cooling station 86.

In the example of FIG. 3, the thermal hydraulic engine 44 works in combination with the low grade heat exchanger 84 for reducing a temperature of fluid in the first cooling loop 72. The thermal hydraulic engine 44 also serves as a source of supplemental electrical power provided by the system 20.

The embodiments shown in FIGS. 1 and 2 do not require a separate low grade heat exchanger as part of the power plant 22 like the low grade heat exchanger 84 of the embodiment of FIG. 3. In the embodiments of FIGS. 1 and 2, the thermal hydraulic engine 44 operates as a low grade heat exchanger of the coolant network. Such embodiments provide a cost savings by eliminating the components needed for a separate low grade heat exchanger in an ancillary cooling loop for the power plant 22. At the same time additional or supplemental electrical power is available from the thermal hydraulic engine 44 so system economies may be enhanced.

The illustrated embodiments integrate a thermal hydraulic engine 44 with a coolant network for a fuel cell power plant 22. The integration of components as shown in the illustrated examples provides an enhanced ability to generate electrical power while addressing the needs for temperature control within a fuel cell power plant.

While different features and components are shown and discussed in connection with individual embodiments, any of those features or components may be combined with features or components of another one of the embodiments. Other combinations or embodiments based upon the disclosed example embodiments are possible.

The preceding description is illustrative rather than limiting in nature. Variations and modifications to the disclosed examples may become apparent to those skilled in the art without departing from the essence of the invention embodied in those examples. The scope of legal protection provided to this invention can only be determined by studying the following claims.

I claim:

1. An electrical power generating system, comprising:
a fuel cell power plant configured to generate electrical power based on a chemical reaction; and
a coolant network that is configured to carry fluid toward the fuel cell power plant where fluid in the coolant network can become heated fluid by absorbing heat from the fuel cell power plant, the coolant network including
a thermal hydraulic engine that is configured to generate electrical power,
a cooling station configured to reduce a temperature of fluid provided to the cooling station,
a first portion configured to carry fluid from the cooling station toward a portion of the fuel cell power plant where fluid in the first portion can be heated,
a second portion configured to carry the heated fluid from the first portion to a heated fluid inlet of the thermal hydraulic engine,
the thermal hydraulic engine being configured to direct heated fluid from the inlet to a section of the thermal hydraulic engine where heat from the heated fluid can be used for generating electrical power,
the thermal hydraulic engine including a fluid outlet that is configured to direct fluid from which heat has been used for generating electrical power away from the thermal hydraulic engine in a direction toward the cooling station,
the cooling station being configured to reduce a temperature of fluid received from the thermal hydraulic engine before the fluid is provided to the first portion.

2. The system of claim 1, wherein the thermal hydraulic engine provides a low grade heat exchanger function within the coolant network.

3. The system of claim 1, wherein
the first portion, the second portion, the thermal hydraulic engine and the cooling station are connected as a coolant loop configured to circulate fluid with the cooling station being upstream of the first portion, the first portion being upstream of the second portion, the second portion being upstream of the thermal hydraulic engine, and the thermal hydraulic engine being upstream of the cooling station.

4. The system of claim 3, wherein the coolant loop is an ancillary cooling loop of the fuel cell power plant.

5. The system of claim 1, comprising an engine cooling loop configured to reduce a temperature of at least some of the thermal hydraulic engine, the engine cooling loop being distinct from the coolant network.

6. The system of claim 5, wherein
the engine cooling loop includes at least one cooling element configured to reduce a temperature of a cooling fluid in the engine cooling loop; and
the engine cooling circuit includes a pump for moving cooling fluid through the engine cooling loop.

7. The system of claim 1, comprising at least one cell stack cooler associated with the cell stack assembly and wherein the first portion includes at least one heat exchanger associated with the at least one cell stack cooler, the at least one heat exchanger being upstream of the second portion of the coolant loop.

8. The system of claim 1, wherein the coolant network includes a pump for circulating fluid through the coolant network.

9. The system of claim 1, comprising an engine cooling loop configured to reduce a temperature of at least some of the thermal hydraulic engine, and wherein
the cooling station is configured for reducing a temperature of fluid in the coolant network and the engine cooling loop;
the engine cooling loop directs fluid from the cooling station toward the thermal hydraulic engine and back to the cooling element.

10. The system of claim 9, comprising a pump that circulates fluid through the coolant network and the engine cooling loop.

11. An electrical power generating system, comprising:
a fuel cell power plant configured to generate electrical power based on a chemical reaction;
a thermal hydraulic engine that is configured to generate electrical power;
a single cooling station configured to reduce a temperature of a cooling fluid; and
a coolant network that includes a first cooling loop including at least one heat rejection heat exchanger downstream of the cooling station and a low grade heat exchanger downstream of the at least one heat rejection heat exchanger, the cooling station being downstream of the low grade heat exchanger, the at least one heat rejection heat exchanger being situated for fluid in the at least one heat rejection heat exchanger to absorb heat associated with operation of the fuel cell power plant, the low grade heat exchanger having a first portion configured to receive heated fluid from the at least one heat rejection heat exchanger and to direct the received fluid toward the cooling station;

the coolant network includes a second cooling loop including a second portion that directs a second fluid through the low grade heat exchanger where second fluid in the second portion is heated by heat from the heated fluid in the first portion of the low grade heat exchanger, the second cooling loop including a third portion configured to direct heated second fluid to a section of the hydraulic engine where heat from the heated second fluid can be used for generating electrical power before the second fluid is returned to the second portion;

the coolant network includes a third cooling loop configured to direct fluid from the cooling station toward the thermal hydraulic engine where the fluid can absorb heat from at least some of the hydraulic engine before returning the fluid to the cooling station.

12. The system of claim 11, wherein the first cooling loop is an ancillary cooling loop of the fuel cell power plant.

13. The system of claim 11, comprising at least one cell stack cooler associated with the cell stack assembly, and wherein the at least one cell stack cooler is associated with the at least one heat rejection heat exchanger for fluid in a first portion of the at least one heat rejection heat exchanger to absorb heat from a cooling fluid in the at least one cell stack cooler, the fluid in the at least one cell stack cooler being heated by heat from the fuel cell stack assembly.

14. The system of claim 11, wherein
the coolant network includes a first pump that circulates cooling fluid through the first cooling loop;
the second cooling loop includes a second pump for circulating second cooling fluid through the second cooling loop.

15. The system of claim 11, wherein the first pump circulates cooling fluid through the third cooling loop.

* * * * *

UNITED STATES PATENT AND TRADEMARK OFFICE
CERTIFICATE OF CORRECTION

PATENT NO. : 9,742,196 B1  
APPLICATION NO. : 15/052089  
DATED : August 22, 2017  
INVENTOR(S) : Paul Margiott Page 1 of 1

It is certified that error appears in the above-identified patent and that said Letters Patent is hereby corrected as shown below:

In the Claims

In Claim 7, Column 6, Line 29; after "cooler associated with" replace "the cell stack assembly" with --the fuel cell power plant--

In Claim 9, Column 6, Line 45; after "the cooling" replace "element" with --station--

In Claim 13, Column 8, Line 4; after "cooler associated with" replace "the cell stack assembly" with --the fuel cell power plant--

Signed and Sealed this  
Twenty-third Day of October, 2018

Andrei Iancu  
*Director of the United States Patent and Trademark Office*